Patented June 8, 1954

2,680,704

UNITED STATES PATENT OFFICE 2,680,704

PREPARATION OF FERMENTATION GLYCERINE

Karl Schneider, Mannheim, Germany, assignor to Backhefe G. m. b. H., Frankfurt am Main, Germany, a firm No Drawing. Application December 5, 1950, Serial No. 199,369

7 Claims. (Cl. 195—38)

The present invention is concerned with a process for the production of fermentation glycerine, in which sugar-containing fermentable substrates are fermented by adding sulphites with yeast into several fermentation stages with the re-use of the glycerine-containing residue and the separated yeast.

According to prior Patent No. 1,698,800, a solution of sugar of a dilution of from 1-20 to 1-11 is fermented with the addition of 75% sodium sulphite and 10% yeast. The fermentation proceeds at a temperature of 30°–35° C. and is complete in 48 hours. Then the yeast is separated and the products in the wort which are volatile below 100° C. are distilled off. The remaining glycerine containing mash is used as the liquid for further fermentation. In the second fermentation step 10–15% of sulphite is added. The yeast from the first step is used in the second and 5% of fresh yeast must be added. It has medium for a further fermentation. For this further fermentation 10–20% of sulphite calculated on the sugar must again be added. The yeast used in the first fermentation is again used in the second fermentation and in addition 10–20% of fresh yeast, calculated on the original quantity of yeast used is added. It has appeared that in practice a further fermentation which is analogous to the second fermentation can follow. The speed of the fermentations with the known processes is lowered so noticeably that further ones are not practicable and even impossible. It is also known that the necessary alkaline medium may be attained with soda. According to the literature fermentation temperatures of 22–38° C. may be used.

The fact that with the known processes after each fermentation stage relatively great proportions of yeast and sulphite are added afresh and that the yeast undergoes serious decomposition in alkaline medium has the result that the purity of the glycerine obtained as end product leaves something to be desired which brings about the known difficulties on purification.

According to the process of the present invention the fermentation glycerine is prepared in such a way that the first fermentation is operated at a temperature of about 20–25° C., i. e. with a very low temperature. Thus the fermentation is hindered. The temperature is gradually increased in the following fermentation stages, during which further temporary temperature lowering takes place which effects afresh a hindering of the fermentation. This has the result that the fermenting in the following fermentations especially in the second and third and in some cases in the fourth fermentation stage takes place in a shorter time.

In the process according to the invention a yield is obtained which is some ½ higher than by known processes. This probably depends on the fact that, in the process according to the invention, though the temperature lowering in combination with the general low temperature the degenerating properties are lessened, the yeast has a longer period for becoming inured to the alkaline fermentation medium and thus its vitality is kept longer in the medium which is abnormal for it.

Of particular advantage is the use of yeast which itself has undergone a kind of fermentation slowing in the production process as is described in my copending United States application Serial No. 199,367 of even date.

The result of the measures according to the invention is that in place of, as up to now, the exhaustion of the yeast appearing after, on average, three fermentations, this exhaustion first happens after five or six fermentations.

The process according to the invention offers a particular advantage in commercial and technical respects in that the fermentation time is decreased, whereby a saving of energy appears and the additional sulphite addition in the further fermentation stages is limited and the additional yeast addition almost ceases completely or is considerably limited. The additional sulphite addition reaches in the highest cases 10% of the weight of the actual sugar to be fermented, the additional yeast addition reaches at most 10% of the original yeast addition. Therefore, as the original sulphite addition of the first fermentation may be used up to the fifth to sixth fermentation, in place of only three times as in the prior processes, an especially high saving of sulphite is achieved.

The concentration of glycerine in the fermentation residue increases by some 20–25%. The higher purity makes the glycerine obtained after purification valuable in several respects particularly in medicine and eases the preparation of ointments.

In order that the invention may be well understood the following example is given only as an illustration.

*Example*

6000 kg. sugar are prepared with 2400 kg. sodium sulphite and 600 kg. yeast in 45,000 litres of fermentation liquid at 23° C. The fermentation proceeds slowly with a slow warming of the liquid. After some 10 hours the temperature is increased to 24° C. and after 20 hours to 25° C. The fermentation is ended after about 40 hours. The yeast is separated, the alcohol and the acetaldehyde contained in the wort driven off in the distillation apparatus, the resulting residue cooled to 24° C. and run into a fermentation vat. A further 6000 kg. of sugar is dissolved in the residue. The separated yeast and 60 kg. fresh yeast, as well as 300 kg. sodium sulphite are added to the fermentation material and the fermentation begun at 25° C. It proceeds with a raising of the temperature in some 35–40 hours. After the separation of the yeast it is distilled, the residue cooled and put back and in this residue 6000 kg. of sugar is dissolved afresh. Then the separated yeast and at the same time 300 kg. sodium sulphite are added. The third fermentation begins at 21° C. The temperature is raised during the fermentation to 27° C. The fermentation is ended after about 30 hours. The removal of the yeast, distillation and cooling of the residue and its putting back again take place. A fourth fermentation with 6000 kg. sugar and with the addition of 600 kg. sodium sulphite is commenced at 25° C. and proceeds with a temperature interval up to 28° C. The process is again carried out with 6000 kg. of recycled, cooled residue a fifth and sixth time with an addition of 600 kg. sodium sulphite and 60 kg. yeast with a temperature interval of 26–30° C. and 28–32° C. respectively. The period of each of the three last fermentations in general exceeds the period of the first fermentation. 22% of glycerine are contained in the residue obtained which corresponds to a quantity of 10,100 kg. glycerine. The yield reaches 28%.

What I claim is:

1. A process for the production of fermentation glycerine which comprises mixing yeast with a sugar containing substrate, adding alkali metal sulphite thereto, fermenting said mixture at a temperature range of about 20° to 25° C. to cause slow fermentation to take place, removing said yeast from said mixture, distilling off alcohol and aldehyde from said mixture, then introducing said removed yeast into said mixture and adding sugar and sulphite thereto, and fermenting the latter mixture at higher temperatures up to 32° C.

2. A process for the production of fermentation glycerine which comprises mixing yeast with a sugar containing substrate, adding alkali metal sulphite thereto, fermenting said mixture at a temperature range of about 20° to 25° C. to cause slow fermentation to take place, removing said yeast from said mixture, distilling off alcohol and aldehyde from said mixture, then introducing said removed yeast into said mixture and adding sugar and sulphite thereto, and fermenting the latter mixture at a temperature of about 25° C., removing said yeast from said second fermentation mixture, then introducing said removed yeast into said second mixture and adding sugar and sulphite thereto, and fermenting the latter mixture at higher temperatures up to 32° C.

3. A process for the production of fermentation glycerine which comprises mixing yeast with a sugar containing substrate, adding alkali metal sulphite thereto, fermenting said mixture at a temperature range of about 20° to 25° C. to cause slow fermentation to take place, removing said yeast from said mixture, distilling off alcohol and aldehyde from said mixture, then introducing said removed yeast into said mixture and adding sugar and sulphite thereto, and fermenting the latter mixture at a temperature of about 25° C., removing said yeast from said second fermentation mixture, then introducing said removed yeast into said second mixture and adding sugar and sulphite thereto, and fermenting the latter mixture at higher temperatures up to 32° C., and repeating said cycle at successively higher temperatures up to said maximum of 32° C.

4. A process according to claim 3 in which there is an intermediate step of fermentation in said cycle at a temperature lower than that of the preceding fermentation.

5. A process according to claim 3 in which the temperatures of the successive stages are about 20° to 25° C., 25° C., 21° to 27° C., 25° to 28° C., 26° to 30° C., and 28° to 32° C.

6. A process according to claim 3 in which the sugar containing substrate contains up to 13% sugar.

7. A process according to claim 6 in which the amount of alkali metal sulphate is about 40% of the weight of sugar in said first fermentation and about 5% to 10% of the weight of sugar in said second fermentation.

References Cited in the file of this patent

UNITED STATES PATENTS

| Number | Name | Date |
|---|---|---|
| 858,691 | Wallerstein | July 2, 1907 |
| 1,425,838 | Cocking et al. | Aug. 15, 1922 |
| 1,698,800 | Ludecke et al. | Jan. 15, 1929 |